(No Model.)
B. F. CARD.
SPEED INDICATING ALARM.
No. 569,171. Patented Oct. 13, 1896.
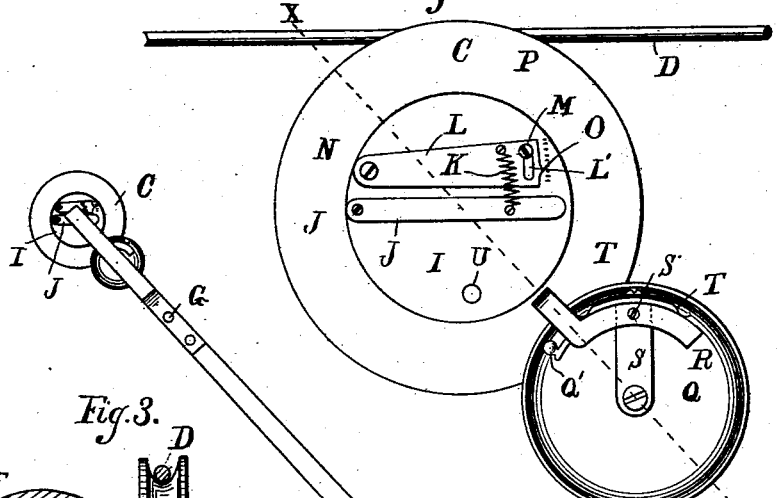
Fig. 2.
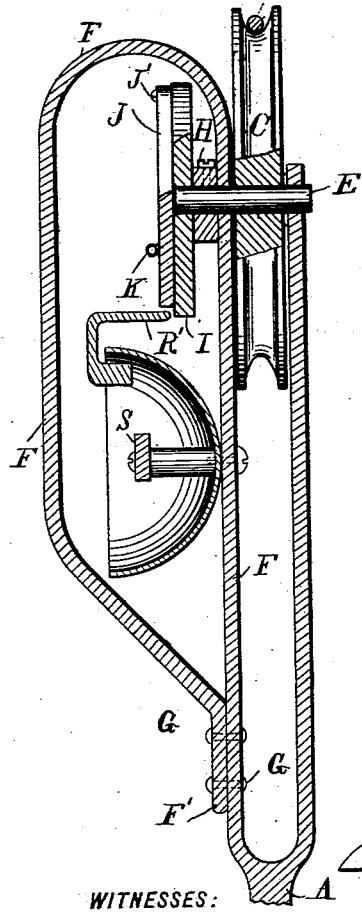
Fig. 3.
Fig. 1.
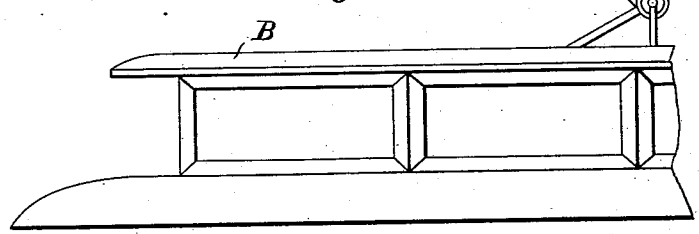
WITNESSES:
Henry F. Dobbin.
Ostelle M. Titus.
INVENTOR
Benj. F. Card.
BY Edward P. Thompson
ATTORNEY

UNITED STATES PATENT OFFICE.

BENJAMIN F. CARD, OF BROOKLYN, NEW YORK.

SPEED-INDICATING ALARM.

SPECIFICATION forming part of Letters Patent No. 569,171, dated October 13, 1896.

Application filed August 31, 1895. Serial No. 561,104. (No model.)

*To all whom it may concern:*

Be it known that I, BENJAMIN F. CARD, a citizen of the United States, and a resident of the city of Brooklyn, in the county of Kings and State of New York, have invented certain new and useful Improvements in Mechanical Speed-Indicators for Electric Cars, of which the following is a specification.

In view of the many serious and fatal accidents which have happened on account of the high speed of electric cars it has become the custom of municipal authorities to require that street-cars shall not run faster than a predetermined and set rate of speed, usually eight miles or sometimes ten miles per hour.

It is the object of my invention to provide automatic means for notifying the motorman, conductor, policeman, and the public that the ordinance is being violated by too great a speed. Heretofore attempts have been made to accomplish a similar object by combining with the car-axle or motor-axle mechanism for automatically indicating the maximum speed, but the necessity of intermediate gearing between the mechanism and the said axle, and therefore the increased cost, together with the difficulty in maintaining a device durable on account of so much dirt under the car and other good and valid objections, have rendered other devices so impracticable that up to the present the determination of the rate of speed is left to the mind of the motorman, whose conjectures on this point should be counted as worthless.

The drawings represent the means I employ for carrying out my invention.

Figure 1 shows a portion of a street-car, a trolley-pole, a trolley, and mechanism combined therewith for indicating the maximum or prohibited speed, all on about the same proportion as would occur in practice. Consequently the device is too small to be understood in its details in this figure. Fig. 2 is a greatly-enlarged view of the mechanism, looked at from the same direction as that in Fig. 1. Fig. 3 is a section of the whole combination forming my invention on about the same scale as in Fig. 2 and made on the dotted line X, except that one of the rotary parts has been turned around to a different position, as will hereinafter appear. The part which is visible in Fig. 3 is that which is at the left of the line X in Fig. 2. The elements lacking in Fig. 2 are seen in Fig. 3.

The trolley-arm is lettered A, and its supporting-car (shown in part) is lettered B.

C is the trolley, adapted to run along the conductor D. The trolley should be fixed to the arbor E, so that when the trolley is set into rotation by its motion along and against the conductor D the axle E will rotate with the trolley C. One of the tines F of the fork supporting the trolley is bent over upon itself away from the trolley and downward again, where its extended end F' is attached to itself by rivets G, so that the mechanism, which is located entirely within the bent portion, is protected from injury by other objects. Upon the axle E is secured by a screw H a disk I, whose function is to support the eccentrically-pivoted arm J, the pivot being J'. During rotation the arm J tends to fly outward by centrifugal force, but its motion is resisted and somewhat limited by a spring K, which is attached at its opposite end to an adjustable arm L, which may be held at different angles, because of the slot L' therein and the tightening-screw M, passing through the slot into the disk I. The arm L can turn about the pivot N when the screw M is loosened. The arm L has a pointer O, opposite the scale P, located upon the disk I. The divisions of the scale may be used to indicate, in conjunction with the pointer, the speed at which the signal will be given automatically. Adjacent to the disk I is a bell Q, whose knocker is Q', and is carried by the vibrator R, pivoted by the pivot S' upon the fixed arm S and partially resisted from vibrating by the spring T, fixed at its center and bearing at its ends upon the vibrator R. The vibrator R has an extension R', passing out of the hollow part of the bell down to near the path of the movable end of the arm J, so that when the disk I rotates rapidly enough the centrifugal force will throw the arm J outward and against the extension R' at each rotation, which occurs so often as to produce a continuous ringing.

Now it may be understood that if the spring K be adjusted by adjusting the lever L the bell will ring at a higher or lower speed of the car, according to the direction of the adjustment. In order to prevent the arm from flying out too far, a stop U is provided upon the disk I, because if the arm J is thrown out far enough to ring the bell it should preferably not be permitted to go much farther, or else it will strike the extension R' toward the center of the arm, drag over the said arm R', and not rebound readily after striking, as it should in order to give a clear sound and be in readiness for another action.

The operation in practice may be briefly stated. The conductor places the trolley upon the wire in the usual manner, the car starts, and the bell is silent, provided the motorman does not permit the car to travel at any moment faster than eight miles an hour, assuming such to be the maximum rate permitted. His judgment cannot be depended upon, nor can his integrity, always. If by neglect or by erroneous conjecture the car should go too fast, the arm J, because of prior adjustment and tests, will fly out so far that the gong will resound at each rotation of the trolley, and, moreover, if the speed is maintained at that rate, or if it is exceeded by any figure whatever, the bell will continue to ring with greater and greater vehemence. Being up in the air and unobstructed the motorman can easily hear it, and if at that time an accident should occur, as it is most probable in view of the high speed, a case could be proven against the company by the numerous witnesses, who could not but have heard the ringing of the bell, which, being tested immediately to determine its correct action, would afford further testimony that the car was going too fast.

This combination of a trolley and speed-indicator, in view of advantages over having an indicator in combination with the car-axle, serves to afford certain proof under all conditions of the excessive speed.

I claim as my invention—

1. The combination of a car propelled by electric energy, a pole extending therefrom, a trolley upon the pole and adapted to roll along an electric conductor and means substantially as described governed by the trolley independently of electrical energy for giving a signal at and beyond a predetermined speed of said car.

2. The combination of a car propelled by electric energy, a pole extending therefrom, a trolley upon the pole and adapted to roll along an electric conductor and means governed by the trolley for giving a signal at and beyond a predetermined speed of said car, said means consisting of a signal and a centrifugal device for operating the signal and driven by said trolley independently of intermediate speed-increasing gearing.

3. The combination of a car propelled by electric energy, a pole extending therefrom, a trolley upon the pole and adapted to roll along an electric conductor and means governed by the trolley for giving a signal at and beyond a predetermined speed of said car, said means consisting of a support fixed to and rotary with said trolley, an arm pivoted upon said support eccentrically to the axis of said trolley and movable in a plane perpendicular to said axis, a spring for limiting the throw of said arm and having one end fixed thereto and the other end attached to an adjustable arm, a bell secured to the tine F of the fork at the end of the trolley-pole, a vibrator R having a striker Q', a spring T and an extension R' of the vibrator lying out of the path of the end of the arm J, whereby and for the purpose set forth in the specification, the end of said arm will be thrown into contact with and strike the extension and ring the bell at and beyond the predetermined speed of said car.

In testimony that I claim the foregoing as my invention I have signed my name, in presence of two witnesses, this 28th day of August, 1895.

BENJAMIN F. CARD. [L. S.]

Witnesses:
   Wm. R. Warren,
   Estelle M. Titus.